US012807512B2

(12) United States Patent
Choi et al.

(10) Patent No.: US 12,807,512 B2
(45) Date of Patent: Nov. 24, 2026

(54) POSITIVE ELECTRODE ACTIVE MATERIAL FOR RECHARGEABLE LITHIUM BATTERY, METHOD OF PREPARING SAME, AND RECHARGEABLE LITHIUM BATTERY INCLUDING SAME

(71) Applicants: POSCO Holdings Inc., Seoul (KR); RESEARCH INSTITUTE OF INDUSTRIAL SCIENCE & TECHNOLOGY, Pohang-si (KR); POSCO CHEMICAL CO., LTD, Pohang-si (KR)

(72) Inventors: Kwon Young Choi, Seoul (KR); Jung Hoon Song, Gwacheon-si (KR); Sanghyuk Lee, Incheon (KR); Inchul Park, Incheon (KR); Ohmin Kwon, Incheon (KR); Byong Yong Yu, Incheon (KR); Kijoo Hong, Incheon (KR); Sang Cheol Nam, Seoul (KR)

(73) Assignees: POSCO Holdings Inc., Seoul (KR); RESEARCH INSTITUTE OF INDUSTRIAL SCIENCE & TECHNOLOGY, Pohang-si (KR); POSCO CHEMICAL CO., LTD, Pohang-si (KR)

( * ) Notice: Subject to any disclaimer, the term of this patent is extended or adjusted under 35 U.S.C. 154(b) by 250 days.

(21) Appl. No.: 18/688,643

(22) PCT Filed: Sep. 2, 2022

(86) PCT No.: PCT/KR2022/013228
§ 371 (c)(1),
(2) Date: Mar. 1, 2024

(87) PCT Pub. No.: WO2023/033606
PCT Pub. Date: Mar. 9, 2023

(65) Prior Publication Data

US 2025/0033994 A1 Jan. 30, 2025

(30) Foreign Application Priority Data

Sep. 3, 2021 (KR) ........................ 10-2021-0117443

(51) Int. Cl.
*H01B 1/08* (2006.01)
*C01G 53/44* (2025.01)
*H01M 4/525* (2010.01)

(52) U.S. Cl.
CPC ............... *C01G 53/44* (2013.01); *H01B 1/08* (2013.01); *H01M 4/525* (2013.01);
(Continued)

(58) Field of Classification Search
CPC .. H01B 1/00; H01B 1/08; H01M 4/36; H01M 4/505; H01M 4/525; C01G 53/44
See application file for complete search history.

(56) References Cited

U.S. PATENT DOCUMENTS 8,303,855 B2 11/2012 Paulsen et al.
11,831,013 B2 * 11/2023 Aoki ..................... H01M 4/525
(Continued)

FOREIGN PATENT DOCUMENTS

CN 104821393 A 8/2015
CN 106910873 A 6/2017
(Continued)

OTHER PUBLICATIONS

Fan et al "An insight into the influence of crystallite size on the performances of microsized spherical Li(Ni0.5Co0.2Mn0.3)O2 cathode material composed of aggregated nanosized particles", J Nanopart Res (2018) 20: 43 https://doi.org/10.1007/s11051-018-4147-0.*
(Continued)

*Primary Examiner* — Mark Kopec
(74) *Attorney, Agent, or Firm* — Sughrue Mion, PLLC

(57) ABSTRACT

The present exemplary embodiments relate to a positive electrode active material, its manufacturing method, and a
(Continued)

lithium secondary battery including the same. The positive electrode active material according to an exemplary embodiment is a metal oxide particle including:

a metal oxide particle comprising a central portion and a surface portion located on the surface of the central portion, wherein, the metal oxide particle includes nickel, cobalt, manganese, and doping elements and is composed of a single particle, and the metal oxide particle includes a crystal phase of layered structure belonging to the R-3m space group on the surface, and an average grain size is 1550 Å or more.

11 Claims, 3 Drawing Sheets

(52) U.S. Cl.
CPC ...... *C01P 2002/52* (2013.01); *C01P 2002/60* (2013.01); *C01P 2002/76* (2013.01); *C01P 2004/03* (2013.01); *C01P 2004/04* (2013.01); *C01P 2004/61* (2013.01); *C01P 2004/62* (2013.01); *C01P 2006/12* (2013.01); *C01P 2006/40* (2013.01)

(56) References Cited

U.S. PATENT DOCUMENTS

| | | | | |
|---|---|---|---|---|
| 12,555,786 | B2 * | 2/2026 | Koshika | H01M 4/525 |
| 2016/0301071 | A1 | 10/2016 | Shizuka et al. | |
| 2019/0296349 | A1 | 9/2019 | Cho et al. | |
| 2021/0002578 | A1 * | 1/2021 | Tanaka | C10M 145/02 |
| 2021/0005835 | A1 * | 1/2021 | Wang | H10K 50/19 |

FOREIGN PATENT DOCUMENTS

| | | | |
|---|---|---|---|
| CN | 109728262 | A | 5/2019 |
| CN | 110422890 | A | 11/2019 |
| CN | 111630692 | A | 9/2020 |
| CN | 112251604 | A | 1/2021 |
| EP | 3 561 920 | A1 | 10/2019 |
| EP | 3843181 | A1 | 6/2021 |
| EP | 3 859 838 | A1 | 8/2021 |
| JP | 11-213999 | A | 8/1999 |
| JP | 2016-95980 | A | 5/2016 |
| JP | 2020-504415 | A | 2/2020 |
| JP | 2020-68210 | A | 4/2020 |
| JP | 2020-514972 | A | 5/2020 |
| JP | 2020-083750 | A | 6/2020 |
| JP | 2021-022547 | A | 2/2021 |
| JP | 2021-509920 | A | 4/2021 |
| JP | 2021-514524 | A | 6/2021 |
| JP | 2021-114410 | A | 8/2021 |
| KR | 10-2014-0047657 | A | 4/2014 |
| KR | 10-2015-0050152 | A | 5/2015 |
| KR | 10-2015-0050458 | A | 5/2015 |
| KR | 10-2017-0063409 | A | 6/2017 |
| KR | 10-2019-0041715 | A | 4/2019 |
| KR | 10-2019-0044327 | A | 4/2019 |
| KR | 10-2019-0059241 | A | 5/2019 |
| KR | 10-2019-0103955 | A | 9/2019 |
| KR | 10-2019-0117199 | A | 10/2019 |
| KR | 10-2019-0139033 | A | 12/2019 |
| KR | 10-2020-0047117 | A | 5/2020 |
| KR | 10-2020-0059164 | A | 5/2020 |
| KR | 10-2020-0070649 | A | 6/2020 |
| KR | 10-2020-0130819 | A | 11/2020 |
| KR | 10-2021-0017554 | A | 2/2021 |
| KR | 10-2021-0080081 | A | 6/2021 |
| KR | 10-2021-0097646 | A | 8/2021 |

OTHER PUBLICATIONS

Julien et al."Surface modification of positive electrode materials for lithium-ion batteries", Thin Solid Films 572 (2014) 200-207.*

Extended European Search Report dated Nov. 18, 2024 in Application No. 22865108.9.

International Search Report for PCT/KR2022/013228 dated Dec. 13, 2022 (PCT/ISA/210).

Office Action issued Mar. 29, 2024 in Korean Application No. 10-2021-0117443.

Third Party Observation for KR 10-2021-0041373 dated Aug. 8, 2024.

Japanese Office Action dated May 7, 2025 in Application No. 2024-514449.

Communication dated Jan. 20, 2026 in Japanese Application No. 2024-514449.

Communication dated Jul. 28, 2026, issued in Korean Application No. 10-2021-0117443.

* cited by examiner

【FIG 1】
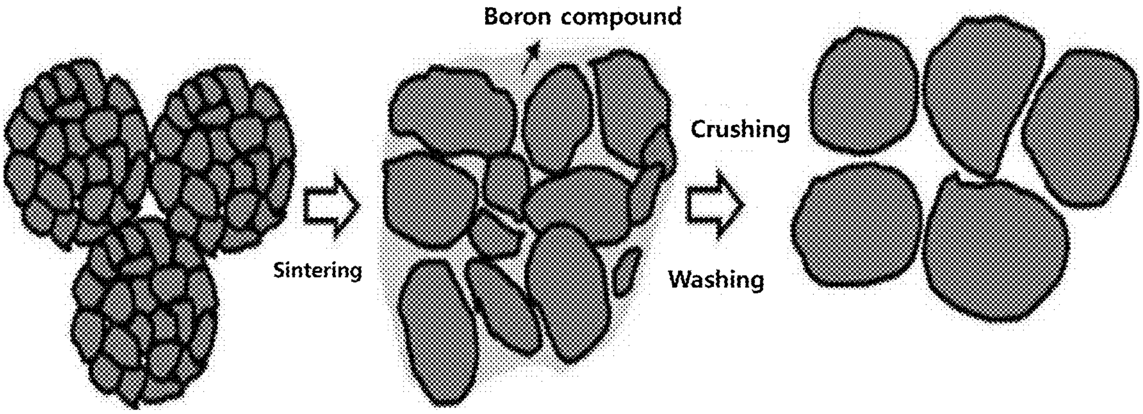
【FIG 2】
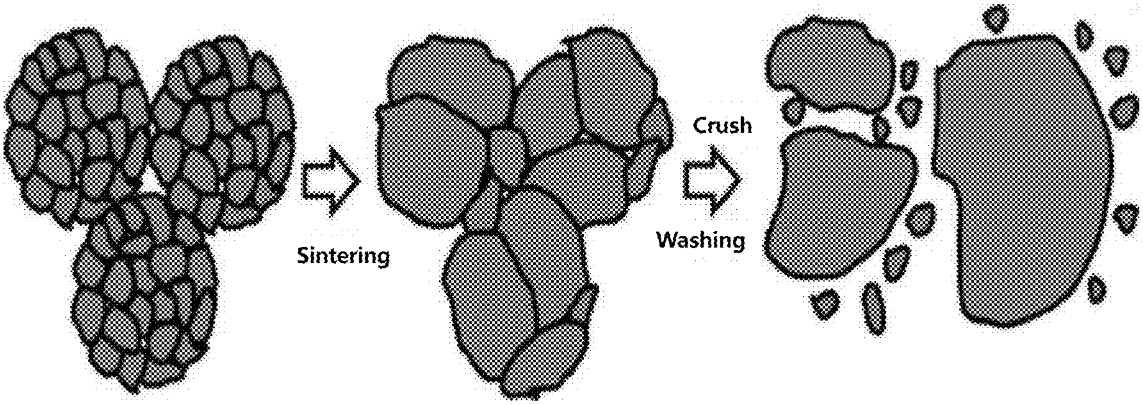
【FIG 3a】
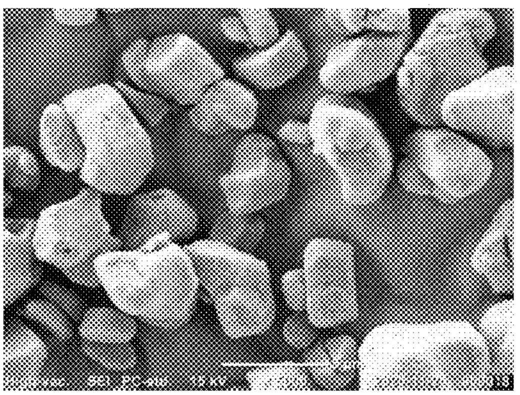

【FIG 3b】
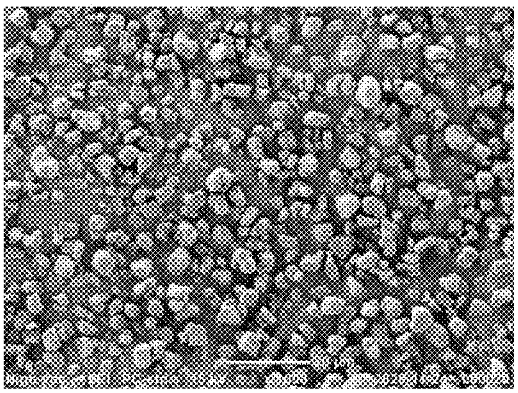
【FIG 4a】
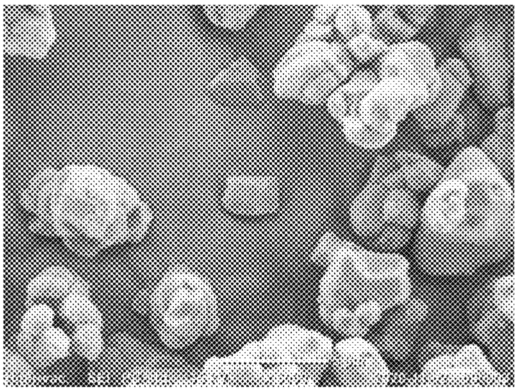
【FIG 4b】
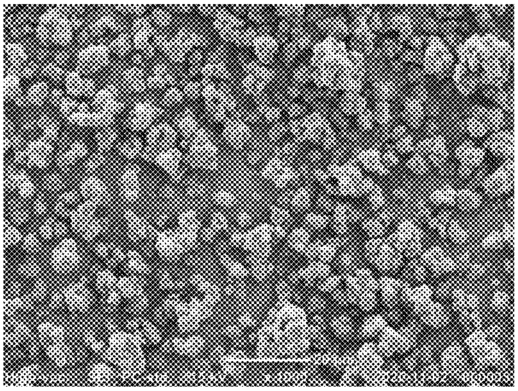

【FIG 5】
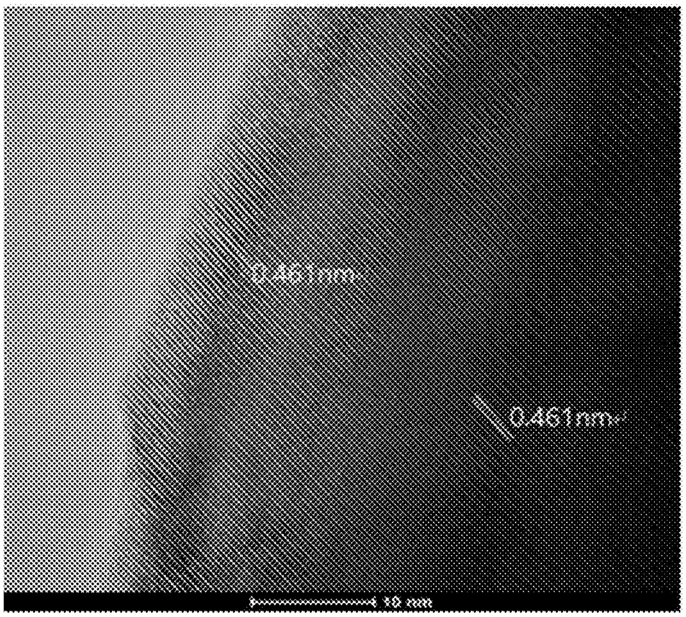
【FIG 6】
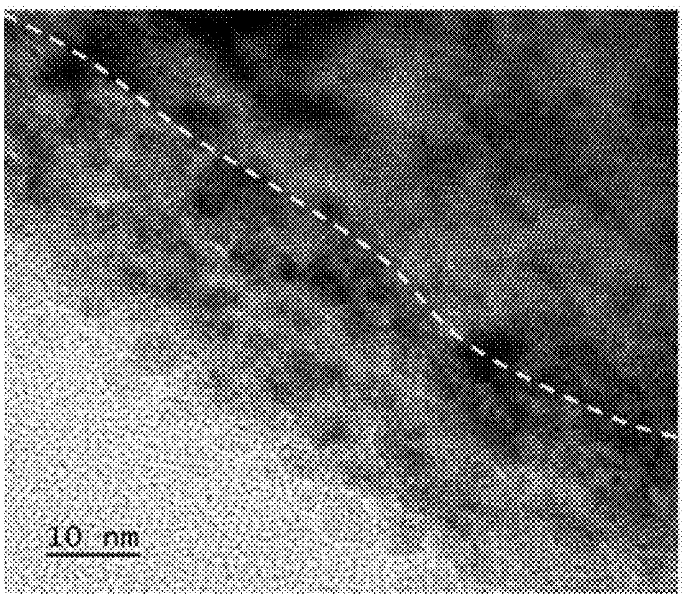

POSITIVE ELECTRODE ACTIVE MATERIAL FOR RECHARGEABLE LITHIUM BATTERY, METHOD OF PREPARING SAME, AND RECHARGEABLE LITHIUM BATTERY INCLUDING SAME

CROSS REFERENCE TO RELATED APPLICATIONS

This application is a National Stage of International Application No. PCT/KR2022/013228 filed Sep. 2, 2022, claiming priority based on Korean Patent Application No. 10-2021-0117443 filed Sep. 3, 2021, the entire disclosures of which are incorporated herein by reference.

FIELD OF THE INVENTION

The present exemplary embodiments relate to a positive electrode active material for a lithium secondary battery, a manufacturing method thereof, and a lithium secondary battery including the same.

DESCRIPTION OF THE RELATED ART

Recently, due to the explosive demand for electric vehicles and the demand for increased driving range, the development of secondary batteries with high-capacity and a high energy density to meet this demand is actively underway around the world.

In order to meet these requirements, methods to improve the density of the electrode plate while using NCM positive electrode materials with high Ni content are being studied. Specifically, research is active on secondary batteries using a bimodal positive electrode active material in which large and small particles are mixed in a certain proportion.

However, the specific surface area of the powder is large in the form of a positive electrode material composed of secondary particles in which primary particles are agglomerated. Because of this, the area in contact with the electrolyte solution is large, so the possibility of gas generation is high. This has the problem of lifespan degradation.

In addition, because the strength of secondary particles is weak, there is a problem that small particles break into primary particles during the rolling process, which also causes the lifespan characteristic to be degraded.

To solve this problem, a method of increasing the size of the primary particle has been proposed.

However, when the size of the primary particle is increased through sintering agent, flux, or over-sintering at high temperature, a rock-salt structure is formed overall on the particle surface. In this case, there is a problem that electrochemical performance such as discharge capacity, lifespan, room temperature resistance, and resistance increase rate are deteriorated.

Therefore, there is a need to develop a technology that can manufacture positive electrode active materials with excellent electrochemical performance while increasing the size of the primary particle.

SUMMARY OF THE INVENTION

In the present exemplary embodiment, it is intended to provide a positive electrode active material that is in single particle form but has excellent electrochemical performance, its manufacturing method, and a lithium secondary battery including the same.

The positive electrode active material according to an exemplary embodiment is a positive electrode active material, comprising:

a metal oxide particle comprising a central portion and a surface portion located on the surface of the central portion, wherein, the metal oxide particle includes nickel, cobalt, manganese, and doping elements and is composed of a single particle, and the metal oxide particle includes a crystal phase of layered structure belonging to the R-3m space group on the surface, and an average grain size is 1,550 Å or more.

An average particle diameter D50 of the positive electrode active material may be 3 μm or more.

The surface portion further can include a crystal phase of rock salt structure belonging to the Fm-3m space group with a thickness of 10 nm or less.

The doping element can include two or more selected from the group consisting of Al, Zr, Nb, Mo, W, Ti, Ce, Mg, P, V, Sr, and B.

A content of the doping element may be a range of 0.0005 mole to 0.04 mole based on 1 mole of the total of the nickel, cobalt, manganese and doping elements.

The doping elements can include Al and Zr.

A content of Al ranges from 0.001 mole to 0.04 mole, based on 1 mole of the total of the nickel, cobalt, manganese and doping elements.

Also, a content of Zr ranges from 0.0016 mole to 0.0064 mole, based on 1 mole of the total of the nickel, cobalt, manganese and doping elements.

A content of nickel in the metal oxide particle is 0.8 mol or more, based on 1 mole of the total of the nickel, cobalt and manganese.

In, the present exemplary embodiment, it is included the single particle and a large particle composed of a secondary particle comprising a primary particle.

A mixing ratio of the single particle and the large particle, in weight ratio, ranges from 30:70 to 10:90 (a single particle: a large particle).

The single particle and the large particle have different compositions.

A manufacturing method of a positive electrode active material according to the other exemplary embodiment, comprises:

preparing an aqueous solution of a metal salt containing nickel raw material, cobalt raw material, manganese raw material, and water; obtaining metal hydroxide by supplying the aqueous solution of the metal salt to a co-precipitation reactor; obtaining a lithium metal oxide by mixing the metal hydroxide, a lithium raw material, a doping raw material, and a boron compound and performing a first sintering step; and performing a second sintering step by mixing the lithium metal oxide which is performed a first sintering step and a lithium raw material.

In the step of obtaining the lithium metal oxide, the boron compound is mixed by adding in the range of 0.05 mole to 0.015 mole, based on 1 mole of a total of nickel, cobalt, manganese and doping elements in a final positive electrode active material.

In the step of obtaining the lithium metal oxide, the mole ratio (Li/Me) of lithium (Li) to the entire metal (Me) excluding lithium is in the range of 1.01 to 1.1.

The first sintering step is performed in the 820° C. to 890° C. range for 8 hours to 20 hours.

The second sintering step is performed in the 600° C. to 800° C. range for 3 to 10 hours.

In the second sintering step, the mixing amount of the lithium raw material ranges from 0.004 mole to 0.053 mole, based on 1 mole of the first sintered lithium metal oxide.

The second sintering step is performed by adding and mixing at least one of a cobalt raw material, a zirconium raw material, a niobium raw material, an aluminum raw material, a titanium raw material, a manganese raw material, and a nickel raw material.

In the second sintering step, an input amount of at least one of the cobalt raw material, the zirconium raw material, the niobium raw material, the aluminum raw material, the titanium raw material, the manganese raw material, and the nickel raw material is 0.001 mole to 0.02 mole, based on 1 mole of the first sintered lithium metal oxide.

In addition, a lithium secondary battery according to another exemplary embodiment includes a positive electrode including a positive electrode active material according to an exemplary embodiment; a negative electrode; and a non-aqueous electrolyte.

The positive electrode active material according to an exemplary embodiment can reduce the resistance increase rate and simultaneously significantly reduce the amount of gas generation. This makes it possible to implement a lithium secondary battery with excellent electrochemical performance.

Additionally, when applying the positive electrode active material of the present exemplary embodiment, the lifespan of the lithium secondary battery can be increased and thermal stability can be improved.

BRIEF DESCRIPTION OF THE DRAWINGS

FIG. 1 is a schematic diagram to explain the manufacturing method of a positive electrode active material composed of a single particle according to an exemplary embodiment.

FIG. 2 schematically shows the manufacturing method of a conventional positive electrode active material composed of single particles.

FIG. 3A is the SEM analysis result measured at 5,000 times the positive electrode active material of exemplary embodiment 1.

FIG. 3B is the SEM analysis result measured at 1,000 times the positive electrode active material of exemplary embodiment 1.

FIG. 4A is the SEM analysis result measured at 5,000 times the positive electrode active material of Comparative Example 1.

FIG. 4B is the SEM analysis result measured at 1,000 times the positive electrode active material of Comparative Example 1.

FIG. 5 is the image measurement result using HRTEM (High resolution transmission electron microscope) equipment for the positive electrode active material manufactured according to exemplary embodiment 2.

FIG. 6 is the image measurement result using HRTEM (High resolution transmission electron microscope) equipment for the positive electrode active material manufactured according to Comparative Example 1.

DETAILED DESCRIPTION OF THE EMBODIMENTS

The terms such as first, second, and third are used to describe various portions, components, regions, layers, and/or sections, but various parts, components, regions, layers, and/or sections are not limited to these terms. These terms are only used to distinguish one part, component, region, layer, or section from another part, component, region, layer, or section. Accordingly, a first part, component, region, layer, or section described below may be referred to as a second part, component, region, layer, or section without departing from the scope of the present invention.

Terminologies as used herein are to mention only a specific exemplary embodiment, and are not to limit the present invention. Singular forms used herein include plural forms as long as phrases do not clearly indicate an opposite meaning. The term "including/comprising/containing/having" as used herein concretely indicates specific characteristics, regions, integer numbers, steps, operations, elements, and/or components, and is not to exclude presence or addition of other specific characteristics, regions, integer numbers, steps, operations, elements, and/or components.

When any portion is referred to as being "above" or "on" another portion, any portion may be directly above or on another portion or be above or on another portion with the other portion interposed therebetween. In contrast, when any portion is referred to as being "directly on" another portion, the other portion is not interposed between any portion and another portion.

Unless defined otherwise, all terms including technical terms and scientific terms as used herein have the same meaning as the meaning generally understood by a person of an ordinary skill in the art to which the present invention pertains. Terms defined in a generally used dictionary are additionally interpreted as having the meaning matched to the related art d° Cument and the currently disclosed contents and are not interpreted as ideal or formal meaning unless defined.

The positive electrode active material according to an exemplary embodiment is a positive electrode active material, comprising:

a metal oxide particle comprising a central portion and a surface portion located on the surface of the central portion, wherein, the metal oxide particle includes nickel, cobalt, manganese, and doping elements and is composed of a single particle, and the metal oxide particle includes a crystal phase of layered structure belonging to the R-3m space group on the surface, and an average grain size is 1,550 Å or more.

As described above, the positive electrode active material composed of secondary particles in which primary particles are agglomerated has problems such as cracks occurring in the small particles, resulting in increased resistance or increased gas generation. As a result, the performance of the lithium secondary battery is degraded. Therefore, by increasing the size of the primary particle and manufacturing it in the form of a single particle, it is possible to reduce the specific surface area of the positive electrode active material and increase particle intensity. This method can improve the performance of lithium secondary batteries.

However, when manufacturing a positive electrode active material in the form of a single particle using the currently proposed method, there is a problem in that a rock-salt structure is formed overall on the surface, which deteriorates the electrochemical performance of the lithium secondary battery.

In the present exemplary embodiment, the electrochemical performance of a lithium secondary battery can be significantly improved by providing a positive electrode active material containing a layered structure crystal phase belonging to the R-3m space group on the surface of a metal oxide particle composed of a single particle.

At this time, the surface portion may include the layered structure crystal phase belonging to the R-3m space group as a whole, or only some regions of the surface portion may include the layered structure crystal phase.

If only some regions of the surface portion contain the layered structure crystal phase, the surface portion may further include a rock-salt structure crystal phase belonging to the Fm-3m space group with a thickness of 10 nm or less.

In this specification, the surface portion (part, region) refers to the portion corresponding to 1 nm to 50 nm depth from the metal oxide particle outermost surface.

Next, the average grain size of the positive electrode active material may be 1,550 Å or more, more specifically 1,550 Å to 2,600 Å, or 2,010 Å to 2,600 Å. If it has this average grain size, it can be defined as a single particle. In addition, if the average grain size satisfies the range, crystallization has progressed well, and residual lithium on the positive electrode active material surface can be reduced and the lifespan characteristic of the lithium secondary battery can be further improved.

The average particle diameter D50 of the positive electrode active material may be 3 μm or more, more specifically 3 μm to 5 μm, 3.5 μm to 4.6 μm or 3.5 μm to 4.3 μm. In the present exemplary embodiment, in order to manufacture a positive electrode active material in the form of a single particle having the above average particle diameter, an expensive crush equipment is not required, and multiple crush processes are not required. That is, even using a general crush device, it is possible to manufacture a single particle positive electrode active material with a uniform particle size distribution and very little fine and coarse powder. Therefore, when the average particle diameter of the positive electrode active material of the present exemplary embodiment satisfies the range, a lithium secondary battery with excellent electrochemical characteristics can be implemented.

Meanwhile, the metal oxide particles may include nickel, cobalt, manganese, and doping elements. The doping element may include two or more types selected from the group consisting of Al, Zr, Nb, Mo, W, Ti, Ce, Mg, B, P, V, Sr, and B. The content of the doping element may range from 0.0005 mole to 0.04 mole or 0.001 mole to 0.03 mole, when the total of the nickel, cobalt, manganese and doping elements is used as a 1 mole reference. At this time, the doping element amount refers to the doping amount of the doping element included in the finally obtained positive electrode active material.

In positive electrode active materials, selection of doping elements is important to ensure lifespan and various electrochemical performances. In the present exemplary embodiment, the characteristics of the positive electrode active material can be improved by applying various doping elements as described above.

In the present exemplary embodiment, the doping elements may include Zr and Al.

Because Zr ions occupy Li sites, Zr acts as a kind of pillar and stabilizes the layered structure by relieving the contraction of the lithium ion path during the charge and discharge process. This phenomenon can increase lifespan by reducing cation mixing and increasing lithium diffusion coefficient.

In addition, Al ions move to the tetragonal lattice site, suppressing the degradation of the layered structure into a spinel structure in which lithium ions move relatively less smoothly.

The content of the Zr ranges from 0.001 mol to 0.01 mol, more specifically, 0.0016 mol to 0.0064 mol, 0.0017 mol to 0.0055 mol or 0.002 mol to 0.005, based on 1 mol of the total of the nickel, cobalt, manganese and doping elements. If the Zr doping amount satisfies the range, the high temperature resistance increase rate can be reduced and simultaneously excellent lifespan characteristics can be secured.

The Al content ranges from 0.001 mole to 0.04 mole, more specifically, 0.004 mole to 0.028 mole, 0.0045 mole to 0.027 mole or 0.0055 mole to 0.025 mole, based on 1 mole of the total of the nickel, cobalt, manganese and doping elements. If the Al doping amount satisfies the range, high temperature lifespan and thermal stability can be further improved.

The content of nickel in the metal oxide particle of the present exemplary embodiment may be 0.8 mol or more, using 1 mol of the nickel, cobalt, and manganese as a reference. More specifically, the nickel content may range from 0.8 to 0.99, 0.85 to 0.99, and 0.88 to 0.99.

As in the present exemplary embodiment, when the content of nickel among the metals in lithium metal oxide is more than 80%, a positive electrode active material with a high-power characteristic can be implemented. The positive electrode active material of the present exemplary embodiment with this composition has a higher energy density per volume, so it can improve the capacity of the battery to which it is applied, and is also very suitable for use in electric vehicles.

The specific surface area (BET) of the metal oxide particle may be 0.20 $m^2/g$ or less, more specifically 0.05 $m^2/g$ to 0.20 $m^2/g$, 0.05 $m^2/g$ to 0.19 $m^2/g$. If the BET value satisfies the range, implementing a battery using this has a very advantageous effect because the amount of gas generated during charging and discharging can be significantly deteriorated.

Meanwhile, the positive electrode active material of the present exemplary embodiment may include a single particle; and a large particle active material composed of a secondary particle including a primary particle. When single particle and large particle active materials are mixed and used in a bimodal form as described above, it is advantageous to increase the density of the electrode mixture.

The mixing ratio of the single particle and the large particle, as a weight ratio (single particle:large particle), may range from 30:70 to 10:90 or 25:75 to 15:85. When the single particles and the large particle active materials in the form of secondary particles are mixed and used at the above weight ratio, the density of the electrode mixture can be increased.

At this time, the single particle positive electrode active material and the large particle positive electrode active material may have the same composition or may have different compositions. Both a single particle type positive electrode active material and a large particle diameter active material may contain nickel, cobalt, manganese, and doping elements.

For example, the single particle positive electrode active material and the large particle positive electrode active material may both have a nickel content of about 0.8 mole, based on 1 mole of the nickel, cobalt, and manganese.

Alternatively, the single particle positive electrode active material may have a nickel content of about 0.8 mole, based on 1 mole of nickel, cobalt, and manganese, and the large particle positive electrode active material may have a nickel content of about 0.9 mole. The content ratio of nickel, cobalt, manganese, and doping elements contained in the single particle positive electrode active material and the large particle positive electrode active material can be appropriately adjusted in the range of 0.8 mole or more of nickel.

A manufacturing method of a positive electrode active material according to the other exemplary embodiment, comprises:

preparing an aqueous solution of a metal salt containing nickel raw material, cobalt raw material, manganese raw material, and water; obtaining metal hydroxide by supplying the aqueous solution of the metal salt to a co-precipitation reactor; obtaining a lithium metal oxide by mixing the metal hydroxide, a lithium raw material, a doping raw material, and a boron compound and performing a first sintering step; and performing a second sintering step by mixing the lithium metal oxide which is performed a first sintering step and a lithium raw material.

The step of preparing an aqueous solution of a metal salt containing nickel raw material, cobalt raw material, manganese raw material, and water and then supplying the aqueous solution of a metal salt to a co-precipitation reactor to obtain metal hydroxide, can be performed according to the common known in the art of positive electrode active material precursor manufacturing method.

In the present exemplary embodiment, in the step of obtaining lithium metal oxide by first sintering step, the metal hydroxide particle, lithium raw material, and doping raw material are mixed, wherein the lithium raw material is added in excess and mixed, and the boron compound is simultaneously mixed together.

FIG. 1 shows a schematic diagram to explain the manufacturing method of a positive electrode active material composed of a single particle according to an exemplary embodiment.

Referring to FIG. 1, in the present exemplary embodiment, excessive amounts of lithium raw material and boron compound are added during the manufacturing process of the positive electrode active material, which helps to easily cause over-sintering.

A lithium raw material forms oxide with the precursor. At this time, the excess lithium reacts with boron to form lithium borate, a type of boron salt.

In the over-sintering process, the presence of lithium borate in the sintering process between primary particles plays a role in weakening the bonding force between primary particles. Accordingly, separation between primary particles of increased size, that is, single particles, is easily achieved during the crush process after sintering. Therefore, it is possible to manufacture a single particle active material with a low fine and coarse powder ratio, that is, excellent uniformity, even by using general crush equipment, without using expensive crush equipment or going through multiple crush processes.

Since this lithium borate is well soluble in water, it can be naturally removed along with the remaining lithium in the water washing process described later.

FIG. 2 schematically shows the manufacturing method of a conventional positive electrode active material composed of single particles.

Referring to FIG. 2, conventionally, primary particles whose size is increased are not easy to crush due to the increased cake strength, and even if crushed, a large amount of fine and coarse powder are present.

However, when manufacturing a positive electrode active material according to the manufacturing method of the present exemplary embodiment as described above, the crush process is easy, so a positive electrode active material composed of single particles with trace amounts of fines and coarse particles can be manufactured.

Specifically, in the step of obtaining the lithium metal oxide, the boron compound may be added and mixed in the range of 0.003 mol to 0.03 mol, or 0.007 mol to 0.028 mol. At this time, the input content was based on a total of 1 mole of nickel, cobalt, manganese, and doping elements in the finally obtained positive electrode active material.

In addition, in the step of obtaining the lithium metal oxide, the mole ratio (Li/Me) of lithium (Li) to the entire metal (Me) excluding lithium may be in the 1.01 to 1.1 range, or 1.03 to 1.08 range.

If the input amount of boron compound and Li/Me meet the range, lithium and boron can sufficiently react to form lithium borate.

Next, the first sintering can be performed for 8 hours to 20 hours in the 820° C. to 890° C., or 830° C. to 880° C. range. If the first sintering process satisfies the conditions, particle growth in the form of a single particle occurs.

Next, the first sintered lithium metal oxide is crushed and then washed with water.

As mentioned above, crush can be performed using conventional crush equipment. Additionally, the washing step is to remove residual lithium present on the surface and can be performed using, for example, distilled water.

Next, after crushing and washing the first sintered lithium metal oxide, a second sintering step may be further included by mixing the washed lithium metal oxide and lithium raw material.

Additionally, the second sintering can be performed for 3 hours to 10 hours in the range of 600° C. to 800° C., or 600° C. to 700° C. If the second sintering process satisfies the condition, the initial resistance can be lowered.

In the second sintering step, the mixing amount of the lithium raw material may be 0.1752 to 2.2780 g, or 0.5257 to 2.2780 g, based on 100 g of the first sintered lithium metal oxide. That is, the range may be 0.004 mole to 0.053 mole or 0.012 mole to 0.053 mole, using 1 mole of the first sintered lithium metal oxide as a reference. If the mixing amount of lithium raw material satisfies the range, the performance of the positive electrode active material can be improved by compensating for the lithium deficiency on the surface. In addition, lifespan and capacity characteristics can be improved by creating an R-3m structure on the surface.

Meanwhile, in the present exemplary embodiment, the second sintering step is performed by adding and mixing at least one of a cobalt raw material, a zirconium raw material, a niobium raw material, an aluminum raw material, a titanium raw material, a manganese raw material, and a nickel raw material.

In this way, when a second sintering process is performed after mixing one or two types of transition metal raw materials in addition to the lithium raw material to the washed lithium metal oxide, an R-3m structure is formed on the single particle surface. And then a lifespan is improved and discharge capacity increases.

In the second sintering step, an input amount of at least one of the cobalt raw material, the zirconium raw material, the niobium raw material, the aluminum raw material, the titanium raw material, the manganese raw material, and the nickel raw material is 0.001 mole to 0.02 mole, and more specifically, 0.005 mole to 0.015 mole, based on 1 mole of the first sintered lithium metal oxide. If the input amount of transition metal raw material satisfies the range, lifespan is improved and discharge capacity increases.

In the present exemplary embodiment, the input amount of the cobalt raw material may range from 0.001 mole to 0.02 mole, more specifically 0.005 mole to 0.015 mole, using 1 mole of primary sintered lithium metal oxide as a reference.

In another exemplary embodiment, it provides a lithium secondary battery comprising:

- a positive electrode including a positive electrode active material according to one embodiment of the present invention, a negative electrode including a negative electrode active material, and an electrolyte positioned between the positive electrode and the negative electrode.

A description related to the positive electrode active material will be omitted because it is the same as that of an exemplary embodiment described above.

The positive electrode active material layer may include a binder and a conductive material.

The binder serves to attach the positive electrode active material particles well to each other and to attach the positive electrode active material to the current collector well.

The conductive material is used to impart conductivity to the electrode, and any electronic conductive material can be used without causing chemical change in the battery.

The negative electrode includes a current collector and a negative electrode active material layer formed on the current collector, and the negative electrode active material layer includes a negative electrode active material.

The negative electrode active material includes a material capable of intercalating/deintercalating lithium ions reversibly, lithium metal, an alloy of lithium metal, a material capable of doping and undoping lithium, or a transition metal oxide.

A material that can intercalate/deintercalate the lithium ion reversibly is a carbon material. In a lithium ion secondary battery, any generally-used carbon-based negative electrode active material can be used, and typical examples thereof are crystalline carbon and amorphous carbon, or combination thereof.

The alloy of the lithium metal is alloy of lithium and metal selected from the group consisting of Na, K, Rb, Cs, Fr, Be, Mg, Ca, Sr, Si, Sb, Pb, In, Zn, Ba, Ra, Ge, Al and Sn.

Materials capable of doping and undoping the lithium include Si, $SiO_x$ ($0<x<2$), Si—Y alloy (the Y is an element selected from the group consisting of an alkali metal, an alkaline earth metal, a group 13 element, a group 14 element, a transition metal, and a rare earth, and its combination thereof, but not Si), Sn, $SnO_2$, Sn—Y (the Y is an element selected from the group consisting of an alkali metal, an alkaline earth metal, a group 13 element, a group 14 element, a transition metal, a rare earth element and the combination thereof, not Sn), and the like.

Examples of the transition metal oxide include vanadium oxide and lithium vanadium oxide. The negative electrode active material layer also includes a binder and may optionally further include a conductive material.

The binder serves to attach the negative electrode active material particles well to each other and to attach the negative electrode active material to the current collector well.

The conductive material is used to impart conductivity to the electrode, and any electronic conductive material can be used without causing chemical change in the battery.

As the current collector, one selected from the group consisting of copper foil, nickel foil, stainless steel foil, titanium foil, nickel foam, copper foam, a conductive metal-coated polymer substrate, and a combination thereof may be used.

The negative electrode and positive electrode are prepared by mixing active material, conductive material and binder in a solvent to prepare an active material composition, and applying this composition to a current collector. Since such an electrode manufacturing method is widely known in the field, detailed description will be omitted in this specification. As the solvent, N-methylpyrrolidone and the like can be used, but is not limited thereto.

The electrolyte contains a non-aqueous organic solvent and a lithium salt.

The non-aqueous organic solvent serves as a medium through which ions involved in the electrochemical reaction of the battery can move.

The lithium salt is a material that dissolves in an organic solvent and acts as a supply source of lithium ion in the battery to enable basic operation of the lithium secondary battery and promotes the movement of lithium ion between the positive electrode and the negative electrode.

Depending on the type of lithium secondary battery, a separator may exist between the positive electrode and the negative electrode. As such a separator, polyethylene, polypropylene, polyvinylidene fluoride or a multilayer of two or more of these may be used, and polyethylene/polypropylene 2-layer separator, a mixed multilayer such as a polyethylene/polypropylene/polyethylene 3-layer separator, polypropylene/polyethylene/polypropylene 3-layer separator, can be used.

Lithium secondary batteries can be classified into lithium ion batteries, lithium ion polymer batteries and lithium polymer batteries according to the type of separator and electrolyte used, and can be classified into cylindrical, prismatic, coin-type, and pouch-type depending on the shape. It can be divided into bulk type and thin film type according to size. Since the structures and manufacturing methods of these batteries are well known in this field, detailed descriptions are omitted.

DETAILED DESCRIPTION OF THE EMBODIMENTS

Hereinafter, an exemplary embodiment will be described in detail. However, this is presented as an example, and the present invention is not limited thereby, and the present invention is only defined by the range of claims to be described later.

Exemplary Embodiment 1—B 0.01 Mol+Zr 0.0035 Mol+Al 0.0085 Mol (1) Preparation of Precursor The precursor was prepared using a general co-precipitation method.

Specifically, $NiSO_4 \cdot 6H_2O$ was used as the nickel raw material, $CoSO_4 \cdot 7H_2O$ as the cobalt raw material, and $MnSO_4 \cdot H_2O$ as the manganese raw material. These raw materials were dissolved in distilled water to prepare a metal salt an aqueous solution.

After preparing the co-precipitation reactor, $N_2$ was purged to prevent oxidation of metal ions during the co-precipitation reaction, and the reactor temperature was maintained at 50° C.

$NH_4$ (OH) was added as a chelating agent to the co-precipitation reactor, and NaOH was used to adjust pH. The precipitate obtained according to the co-precipitation process was filtered, washed with distilled water, and dried in an oven at 100° C. for 24 hours to prepare a positive electrode active material precursor.

The composition of the manufactured precursor was $(Ni_{0.92}Co_{0.04}Mn_{0.04})(OH)_2$, and the average particle diameter D50 was about 4 μm.

(2) Manufacturing of Positive Electrode Active Material 161 g of $LiOH·H_2O$, 2.3 g of $H_3BO_3$, 2.45 g of $Al(OH)_3$, and 1.59 g of $ZrO_2$ were weighed and mixed uniformly with 339 g of the precursor prepared in the (1), and a first sintering was done how the mixture was sintered in the form of a box through which oxygen inflows at 1,000 mL/min. The first sintering step can be performed at 830-890° C. for 8 to 20 hours.

At this time, the molar ratio (Li/Me) of lithium (Li) to all metals (Me) excluding lithium was designed to be 1.05. B was also added in an amount of 0.01 mol based on 1 mol of the total of nickel, cobalt, manganese, and doping elements in the final positive electrode active material.

The sintered material was crushed using an ACM (Air classifying mill) washed with water to remove residual lithium on the surface, and then dried for 12 hours.

Next, about 0.4205 g of $LiOH·H_2O$ (0.026 mol) and 0.6603 g of $Co_3O_4$ (0.0033 mol) were mixed per 80 g of dried positive electrode active material, and then second sintered under an oxygen atmosphere to obtain the positive electrode active of Exemplary Embodiment 1, which consists of a single particle. The second sintering step was performed at 600-800° C. for 5 hours.

Exemplary Embodiments 2 to 8 and Comparative Example 1

Except that when manufacturing positive electrode active material, the content of lithium raw material and the content of one of the cobalt raw material, zirconium raw material, and niobium raw material per 80 g of dried positive electrode active material were adjusted as shown in the following Table 1, a positive electrode active material was manufactured using the same method as exemplary embodiment 1.

Comparative Example 2

161 g of $LiOH·H_2O$, 2.45 g of $Al(OH)_3$, and 1.59 g of $ZrO_2$ were weighed and mixed uniformly with 339 g of the precursor prepared in the (1), and the mixture was subjected to first sintering in a box-shaped sintering furnace through which oxygen inflows at 1,000 mL/min. The first sintering step can be performed at 830-890° C. for 8 to 20 hours.

At this time, the mole ratio (Li/Me) of lithium (Li) to the entire metal (Me) excluding lithium was designed to be 1.05.

The sintered material was crushed using an ACM (Air classifying mill), washed with water to remove residual lithium on the surface, and then dried for 12 hours.

Next, the dried positive electrode active material was subjected to second sintering under an oxygen atmosphere to prepare the positive electrode active material of Comparative Example 1. The second sintering step was performed at 600-800° C. for 5 hours.

Comparative Example 3

Except that when manufacturing positive electrode active material, the first sintering process is performed at 730-760° C., and when lithium raw material and doping raw material are input, the mole ratio of lithium (Li) to the entire metal (Me) excluding lithium (Li/Me) was designed at 1.03, the positive electrode active material of Comparative Example 2 was manufactured using the same method as Comparative Example 1,

TABLE 1

| | First sintering step | | | | Second sintering step | | | | |
|---|---|---|---|---|---|---|---|---|---|
| Classification | Ration of Li/Me | B(mol) | Zr(mol) | Al(mol) | $LiOH•H_20$ (mol) | $Co_30_4$ (mol) | $Zr0_2$ (mol) | $Nb_20_5$ (mol) | $Al(OH)_3$ (mol) |
| Example 1 | 1.05 | 0.01 | 0.0035 | 0.0085 | 0.0122 | 0.0033 | — | — | — |
| Example 2 | 1.05 | 0.01 | 0.0035 | 0.0085 | 0.0265 | 0.0033 | — | — | — |
| Example 3 | 1.05 | 0.01 | 0.0035 | 0.0085 | 0.0529 | 0.0033 | — | — | — |
| Example 4 | 1.05 | 0.01 | 0.0035 | 0.0085 | 0.0529 | — | 0.0034 | — | — |
| Example 5 | 1.05 | 0.01 | 0.0035 | 0.0085 | 0.0529 | — | — | 0.002 | — |
| Example 6 | 1.05 | 0.01 | 0.0035 | 0.0085 | 0.0529 | — | — | — | 0.0034 |
| Example 7 | 1.05 | 0.01 | 0.0035 | 0.0085 | 0.0529 | 0.0033 | 0.0034 | — | — |
| Example 8 | 1.05 | 0.01 | 0.0035 | 0.0085 | 0.0529 | 0.0033 | — | — | 0.0034 |
| Comparative example 1 | 1.05 | 0.01 | 0.0035 | 0.0085 | — | 0.0033 | — | — | — |
| Comparative example 2 | 1.05 | — | 0.0035 | 0.0085 | — | — | — | — | — |
| Comparative example 3 | 1.03 | — | 0.0035 | 0.0085 | — | — | — | — | — |

Experimental Example 1—SEM Analysis

SEM analysis was performed on the positive electrode active material manufactured according to exemplary embodiment 1 and Comparative Example 1, as shown in FIG. 3A, FIG. 3B, FIG. 4A, and FIG. 4B.

FIG. 3A is the SEM analysis result measured at ×5,000 times for the positive electrode active material of exemplary embodiment 1. FIG. 3B is the SEM analysis result measured at ×1,000 times for the positive electrode active material of exemplary embodiment 1.

FIG. 4A is the SEM analysis result measured at ×5,000 times for the positive electrode active material of Comparative Example 1. FIG. 4B is the SEM analysis result measured at ×1,000 times for the positive electrode active material of Comparative Example 1.

Referring to FIG. 3A, it can be seen that the positive electrode active material manufactured according to exemplary embodiment 1 is composed of one particle, that is, a single particle. Also, referring to FIG. 3B, it can be seen that the single particle shape is uniform, and its size is also very uniform, without fine and coarse particles. In contrast, referring to FIG. 4A and FIG. 4B, it can be seen that the single particle form and the monolithic form consisting of multiple particles are mixed.

Like the present exemplary embodiment, a positive electrode active material with excellent particle size uniformity, that is, containing almost no fines and coarse particles, can be used as a positive electrode active material in a bimodal form.

When manufacturing an electrode using this bimodal positive electrode active material, the energy density can be increased by improving the rolling rate of the electrode.

Experimental Example 1—Measurement of Particle Size Distribution

For the positive electrode active material manufactured according to Exemplary Embodiment 1 to 9 and Comparative Example 1 to 2, the average particle diameter D50 was measured using Particle Size Analyzer. The results are shown in the following Table 2.

Referring to Table 2, in the case of exemplary embodiments 1 to 9, which introduced a boron compound along with an excessive amount of lithium raw material during the first sintering, it can be seen that the particle size distribution of the manufactured positive electrode active material was very uniform.

On the other hand, it can be seen that the positive electrode active material of Comparative Examples 1 and 2, which did not use a boron compound during the first sintering, has a relatively large average particle size D50 and a large average grain size compared to the positive electrode active material of the exemplary embodiment.

In addition, it can be confirmed that the positive electrode active material of exemplary embodiments 1 to 9 has an average grain size of 1,550 Å or more, more specifically 1,550 Å to 2,600 Å, or 2,010 Å to 2,600 Å. In other words, it can be seen that the average grain size of the positive electrode active material according to the exemplary embodiment has greatly increased overall compared to Comparative Examples 1 and 2. This means that crystallization has progressed better, and when this positive electrode active material is applied to a lithium secondary battery, it is very advantageous as it can improve the lifespan characteristic of the battery and reduce residual lithium.

Referring to the results in Table 2, it can be seen that the boron compound added during the first sintering forms a positive electrode active material in the form of a single particle and has a very significant impact on the particle uniformity of the simultaneously formed positive electrode active material.

Experimental Example 2—Particle Characteristic Evaluation (1) Specific Surface Area Measurement The specific surface area of the positive electrode active material manufactured in the exemplary embodiment and comparative example was measured using BET measurement equipment (Micromeritics TriStar II 3020).

(2) XRD Measurements

For the positive electrode active material manufactured in the exemplary embodiment and comparative example, X-ray diffraction was measured using CuKα rays.

Using XRD equipment (X'pert3 powder diffraction, Panalytical), the intensity (peak area) of the (003) and (104) planes and the intensity of the (110) plane were measured at a scan speed (°/s) of 0.328. From this result, I(003)/I(104) was obtained and shown in the following Table 2.

Referring to Table 2, the specific surface area (BET) of exemplary embodiments 1 to 9 was less than 0.19 $m^2/g$, which was reduced compared to Comparative Example 1, which was manufactured as a mixture of single particles and secondary particles, and which was significantly reduced compared to Comparative Example 2, which was entirely manufactured in the form of secondary particles. As such, the positive electrode active material of the present exemplary embodiment has a very low BET value and can significantly deteriorate the amount of gas generated during cell charging and discharge, which has a very advantageous effect.

In addition, considering that the I(003)/I(104) values of the positive electrode active material of Exemplary Examples 1 to 9 are higher than those of Comparative Examples 1 and 2, it can be seen that the resistance increase rate decreases.

Experimental Example 3—Electrochemical Evaluation (1) Coin-Type Half-Cell Manufacturing A CR2032 coin cell was manufactured using the positive electrode active material manufactured as above, and then electrochemical evaluation was performed.

Specifically, positive electrode active material, conductive material (Denka Black), and polyvinylidene fluoride binder (Product name: KF1120) were mixed at a weight ratio of 96.5:1.5:2, and this mixture was mixed with N-methyl-2-pyrrolidone solvent so that a positive electrode active material slurry was prepared with the solid content was about 30 wt %.

The slurry was coated on aluminum foil (thickness: 15 μm, as a positive electrode current collector) using a doctor blade, dried, and rolled to manufacture a positive electrode. The loading amount of the positive electrode was about 15 $mg/cm^2$, and the rolling density was about 3.4 $g/cm^3$.

A 2032 coin-type half-cell was manufactured using a conventional method using the positive electrode, lithium metal negative electrode (thickness 300 μm, MTI), electrolyte solution, and polypropylene separator. The electrolyte solution is prepared by dissolving 1M $LiPF_6$ in a mixed solvent of ethylene carbonate, dimethyl carbonate and ethylmethyl carbonate (EMC) (mixing ratio EC:DMC:EMC=3:4:3 volume %) and then adding vinylene carbonate (VC) was added with 3 wt % to it.

(2) Evaluation of Charge and Discharge Characteristics

The coin-type half-cell manufactured in the (1) was aged for 10 hours at a room temperature of 25° C., and then charge and discharge tests were performed.

For capacity evaluation, 205 mAh/g was used as the reference capacity, and the charge and discharge conditions were constant current (CC)/constant voltage (CV) 2.5V to 4.25V and 1/20 C cut-off. Initial capacity was measured at 0.1 C charge/0.1 C discharge.

(3) Lifespan Characteristic Measurement

The lifespan characteristic was measured 30 times under 0.3 C charge/0.3 C discharge condition at high temperature 45° C.

(4) Resistance Characteristic Measurement

The room temperature initial resistance (DC-IR, Direct current internal resistance) is determined by placing the battery at 25° C. with a constant current-constant voltage of 2.5V to 4.25V, 1/20 C cut-off condition, 0.2 C charge, and 0.2 discharge was performed once, and the voltage value was measured 60 seconds after applying the discharge current at 4.25V charge 100%, and then calculated.

The resistance increase rate was calculated by measuring the resistance after 30 cycle lifespans at a high temperature of 45° C. compared to the initially measured resistance (room temperature initial resistance) and converting the increase rate into a percentage (%). The method was performed the same as the initial resistance measurement method.

TABLE 2

| | Particle size (D50, μm) | Crystalline size(Å) | I(003)/ I(104) | BET (m2/g) | Resistance at R.T. (Ω) | Resistance increase rate at H.T. (%) | 0.1 C discharge capacity (mAh/g) | Life span (%) |
|---|---|---|---|---|---|---|---|---|
| Example 3 | 4.27 | 2,037 | 1.1925 | 0.17 | 24.7 | 82.5 | 203.2 | 94.5 |
| Example 4 | 4.25 | 2,136 | 1.1935 | 0.18 | 26.1 | 87.6 | 201.2 | 94.6 |
| Example 5 | 4.25 | 2,069 | 1.1925 | 0.16 | 25.9 | 93.1 | 199.7 | 93.8 |
| Example 6 | 4.26 | 2,125 | 1.1934 | 0.16 | 26 | 90.1 | 200.7 | 94.1 |
| Example 7 | 4.28 | 2,285 | 1.1936 | 0.17 | 25.5 | 83.5 | 201.8 | 94.6 |
| Example 8 | 4.26 | 2,279 | 1.1935 | 0.19 | 25.9 | 84.5 | 201.5 | 94.3 |
| Comparative example 1 | 4.23 | 2,436 | 1.1934 | 0.18 | 22 | 162.4 | 193.5 | 93.4 |
| Comparative example 2 | 5.4 | 2,007 | 1.185 | 0.2 | 22.4 | 178 | 190 | 91.8 |
| Comparative example 3 | 4.7 | 1,100 | 1.192 | 0.68 | 25.3 | 138.3 | 210.5 | 90.8 |

Referring to Table 2, it can be seen that the high temperature resistance increase rate of the positive electrode active material of exemplary embodiments 1 to 9 is significantly lower than that of Comparative Examples. In addition, it can be seen that the lifespan characteristic of the positive electrode active material of Exemplary Examples 1 to 9 is significantly superior to that of Comparative Examples 1 and 2.

Experimental Example 4-Positive Electrode Active Material Structure Analysis For the positive electrode active material manufactured according to Exemplary Embodiment 2 and Comparative Example 1, images were measured using HRTEM (High resolution transmission electron microscope) and shown in FIG. 5 and FIG. 6.

Referring to FIG. 5, it can be seen that the positive electrode active material of exemplary embodiment 2 has a layered structure crystal phase belonging to the R-3m space group formed on the surface portion.

Referring to FIG. 6, It can be seen that the positive electrode active material of Comparative Example 1 has a 20 to 30 nm layer of rock salt structure crystal phase belonging to the Fm-3m space group on the surface.

The present invention is not limited to the exemplary embodiments, but can be manufactured in a variety of different forms, and in the technical field to which the present invention belongs, a person of an ordinary skill can do so without changing the technical idea or essential features of the present invention. It will be understood that it can be implemented in other specific forms. Therefore, the exemplary embodiments described above should be understood in all respects as illustrative and not limiting.

What is claimed is:

1. A positive electrode active material, comprising:

a metal oxide particle comprising a central portion and a surface portion located on the surface of the central portion, wherein, the metal oxide particle includes nickel, cobalt, manganese, and doping elements and is composed of a single particle, the metal oxide particle includes a crystal phase of layered structure belonging to the R-3m space group on the surface, and an average grain size is 1,550 Å or more, and the surface portion further includes a crystal phase of rock salt structure belonging to the Fm-3m space group with a thickness of 10 nm or less.

2. The positive electrode active material of claim 1, an average particle diameter D50 of the positive electrode active material is 3 μm or more.

3. The positive electrode active material of claim 1, the doping element includes two or more selected from the group consisting of Al, Zr, Nb, Mo, W, Ti, Ce, Mg, P, V, Sr, and B.

4. The positive electrode active material of claim 1, a content of the doping element is a range of 0.0005 mole to 0.04 mole based on 1 mole of the total of the nickel, cobalt, manganese and doping elements.

5. The positive electrode active material of claim 1, the doping elements include Al and Zr.

6. The positive electrode active material of claim 5, a content of Al ranges from 0.001 mole to 0.04 mole, based on 1 mole of the total of the nickel, cobalt, manganese and doping elements.

7. The positive electrode active material of claim 5, a content of Zr ranges from 0.0016 mole to 0.0064 mole, based on 1 mole of the total of the nickel, cobalt, manganese and doping elements.

8. The positive electrode active material of claim 1, a content of nickel in the metal oxide particle is 0.8 mol or more, based on 1 mole of the total of the nickel, cobalt and manganese.

9. The positive electrode active material of claim 1, wherein, it is included the single particle and a large particle composed of a secondary particle comprising a primary particle.

10. The positive electrode active material of claim 9, a mixing ratio of the single particle and the large particle, in weight ratio, ranges from 30:70 to 10:90.

11. The positive electrode active material of claim 10, the single particle and the large particle have different compositions.

* * * * *